J. L. SCHEUBLE.
CHRONOMETRIC ELECTRICAL SWITCH.
APPLICATION FILED APR. 16, 1909.

936,950.

Patented Oct. 12, 1909.

J. L. SCHEUBLE.
CHRONOMETRIC ELECTRICAL SWITCH.
APPLICATION FILED APR. 16, 1909.

936,950.

Patented Oct. 12, 1909.

Witnesses
W. C. Stein
L. A. L. McIntyre

Inventor
Joseph L. Scheuble
by Hopkins & Eich Attys.

J. L. SCHEUBLE.
CHRONOMETRIC ELECTRICAL SWITCH.
APPLICATION FILED APR. 16, 1909.

936,950.

Patented Oct. 12, 1909.

Witnesses
W. C. Stein
L. A. L. McIntyre

Inventor
Joseph L. Scheuble
by Hopkins & Eicks Attys.

J. L. SCHEUBLE.
CHRONOMETRIC ELECTRICAL SWITCH.
APPLICATION FILED APR. 16, 1909.

936,950.

Patented Oct. 12, 1909.
9 SHEETS—SHEET 6.

Witnesses
W. C. Stein
L. A. McIntyre

Inventor
Joseph L. Scheuble
by Hopkins & Eiarls attys.

J. L. SCHEUBLE.
CHRONOMETRIC ELECTRICAL SWITCH.
APPLICATION FILED APR. 16, 1909.

936,950.

Patented Oct. 12, 1909.

Witnesses
Dr. W. C. Stein
L. A. L. McIntyre

Inventor
Joseph L. Scheuble
by Hopkins & Eicks Attys.

J. L. SCHEUBLE.
CHRONOMETRIC ELECTRICAL SWITCH.
APPLICATION FILED APR. 16, 1909.

936,950.

Patented Oct. 12, 1909.
9 SHEETS—SHEET 8.

J. L. SCHEUBLE.
CHRONOMETRIC ELECTRICAL SWITCH.
APPLICATION FILED APR. 16, 1909.

936,950.

Patented Oct. 12, 1909.
9 SHEETS—SHEET 9.

UNITED STATES PATENT OFFICE.

JOSEPH L. SCHEUBLE, OF ST. LOUIS, MISSOURI.

CHRONOMETRIC ELECTRICAL SWITCH.

936,950.   Specification of Letters Patent.   Patented Oct. 12, 1909.

Application filed April 16, 1909. Serial No. 490,288.

*To all whom it may concern:*

Be it known that I, JOSEPH L. SCHEUBLE, a citizen of the United States, and resident of St. Louis, Missouri, have invented certain new and useful Improvements in Chronometric Electrical Switches, of which the following is a specification.

My invention relates to an improved chronometric electric switch, and has for its object to provide means whereby an electric current may be closed or broken through a rotary snap-switch or other switch at a predetermined time.

In that form of my invention which is illustrated in the drawings, I provide a suitable mechanism for opening and closing a rotary snap-switch 20 by the mechanical rotation of its key 21. The key 21 is of the form usually employed in the art, and to engage with it I have provided fingers 22—22 carried by the revoluble plate 23 mounted on the shaft 24. The shaft 24 is journaled through the parallel plates 25 and 26, between which plates 25 and 26 I provide a train of gears as follows: the gear 27 meshing with the pinion 28 upon the gear 29; the gear 29 intermeshing with the pinion 30 secured to the gear 31; the gear 31 intermeshing with the pinion 32 on the gear 33, which, in turn, intermeshes with the small gear 34 mounted on the shaft 35 driven by the motor 36.

Figure 4:
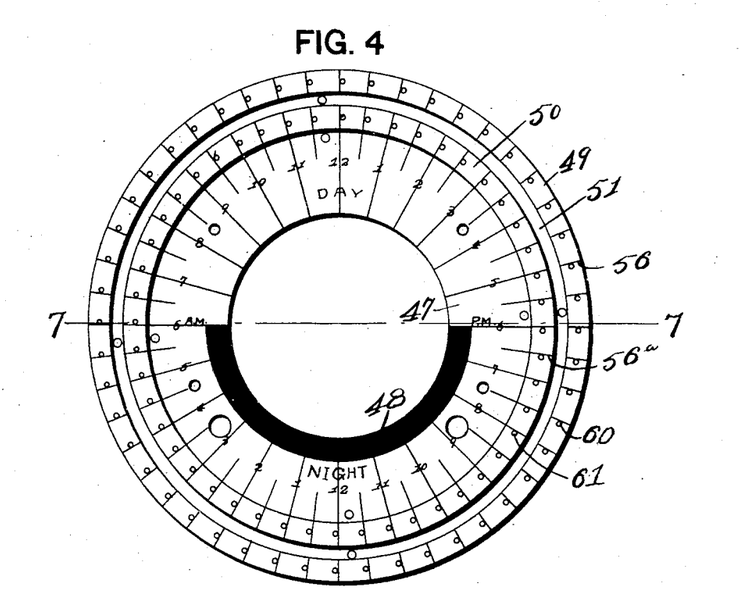
Fig. 4 is a plan view of the dial of said clock.
Figure 5:
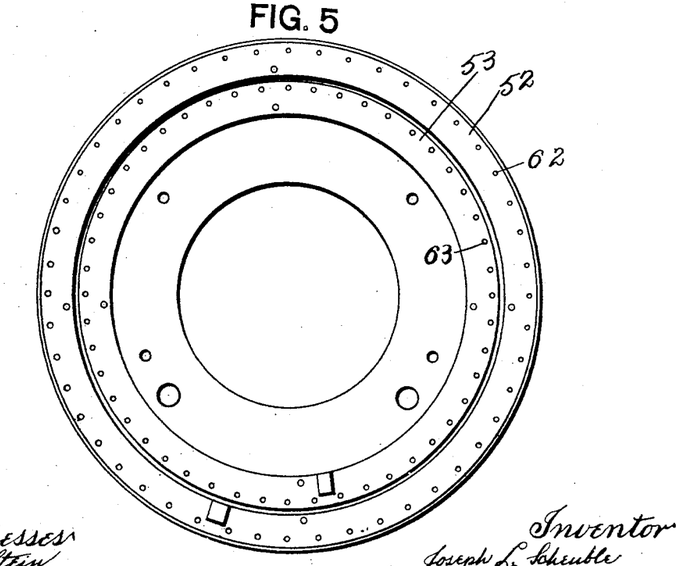
Fig. 5 is a rear plan view of the concentric rings upon which said dial is mounted.
Figure 6:
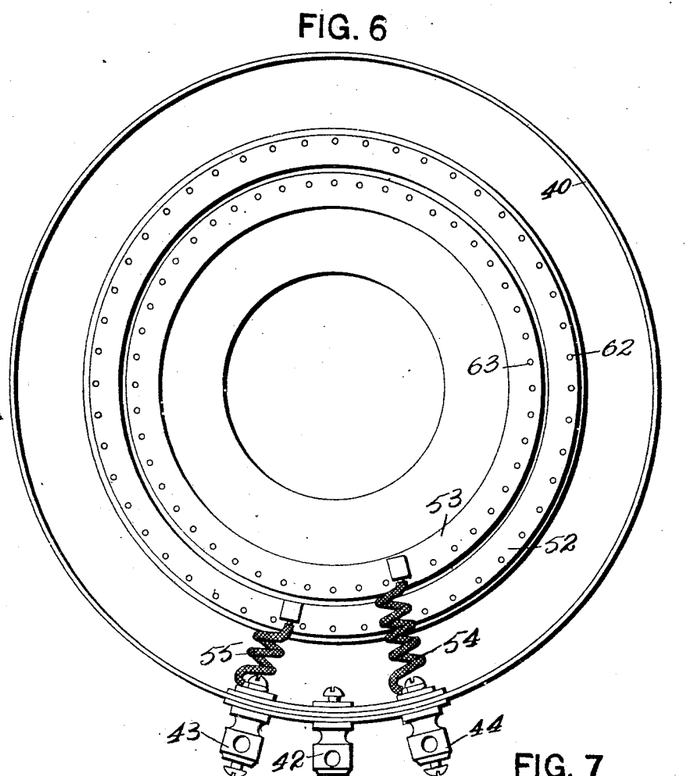
Fig. 6 is a similar view of the concentric rings upon which said dial is mounted, showing their electrical connections.

The electric current supplied to the motor 36 is received from the contact posts 37, 38, 39 and 94. This electric current thus supplied is fed intermittently by reason of the circuit-closing and circuit-breaking appliance embodied in the clock mechanism which may be described as follows. The housing 40 containing the clock movement 41 is provided with binding posts 42, 43 and 44, of the construction illustrated in section in Fig. 2. The electric current supplied to the binding posts 42 is communicated to the clock mechanism 41 through the wire 45. The clock movement 41 is of any of the types known to the art, save that it is geared to cause the revolution of the single hand 46 once in every twenty-four hours. The clock is provided with a dial 47 constructed of insulating material and graduated to indicate twenty-four hours; the hours from six p. m. to six a. m. being distinguished from the hours indicated upon the other half of the dial 47 by means of suitable indicia, such as the semi-circular black band 48 (see Fig. 4). Within its periphery the dial 47 is provided with the ratcheted band 49; within which ratchet band 49 is the concentric ratcheted band 50, separated from the band 49 by the annular groove 51 (see Figs. 1, 4 and 7). The band 49 is superimposed upon the conductive ring 52; while the band 50 is similarly superimposed upon the smaller concentric conductive ring 53; the ring 53 being energized from the binding post 44 by the connecting wire 54, and the ring 49 being energized from the binding post 43 by means of the conductive wire 55 (see Fig. 6).

Figures 7, 8:
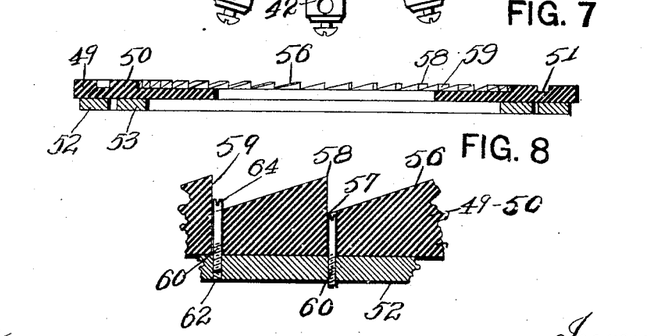
Fig. 7 is a diametric sectional view of the dial, taken along the line 7—7 of Fig. 4.
Fig. 8 is a longitudinal sectional view of two of the ratchets with which said dial is provided, showing the adjustable contact posts mounted in the depressions of said ratchets.

The ratchet teeth upon the bands 49 and 50 are indicated by the numeral 56, and their construction is illustrated in a larger sectional view in Fig. 8, where the bases of the ratchet teeth 56 are indicated by the numeral 57, their apices by the numeral 58 and their vertical faces by the numeral 59. The object of thus forming the ratchet teeth is to permit the contacting springs 68 and 69 to form the instantaneously-operating electrical connection through the hand 46, the connection being established by the spring ends of the contacting springs 68 or 69 snapping into place and contacting with the pins 57 and 64 by dropping from the apices 58 into contact with said pins. At the base 57 of each of the ratchet teeth 56 and in alinement with the vertical face 59, I provide a vertical adjustable contact post 60, these posts being indicated by the numeral 60 in the outer band 51, and by the numeral 61 in the inner band 50. The adjustable contact posts 60 and 61 are seated in perforations 62 and 63 in the bands 49 and 50, respectively, and are in radial alinement with each other (see Figs. 1, 4, 5 and 6). The contact posts 60 and 61 are slotted as indicated by the numeral 64 (see Fig. 8) to permit of their being adjusted by means of a screw-driver, while they are screw-threaded on their bases to correspond with threads in the perforations 62 and 63.

To distinguish the ratchet teeth on the inner bands from those on the outer band 51, those on the inner band 50 will be referred to as 56ª and those on the outer band 49 as 56.

Figure 1:
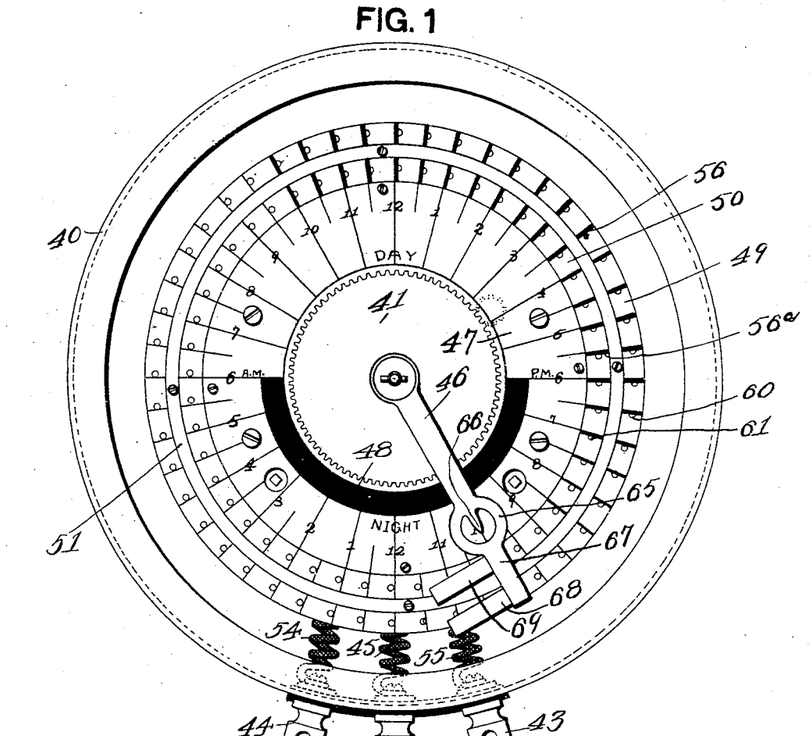
—Figure 1 is a front plan view of the dial of the clock employed in that embodiment of my invention which is here illustrated.
Figures 2, 3:
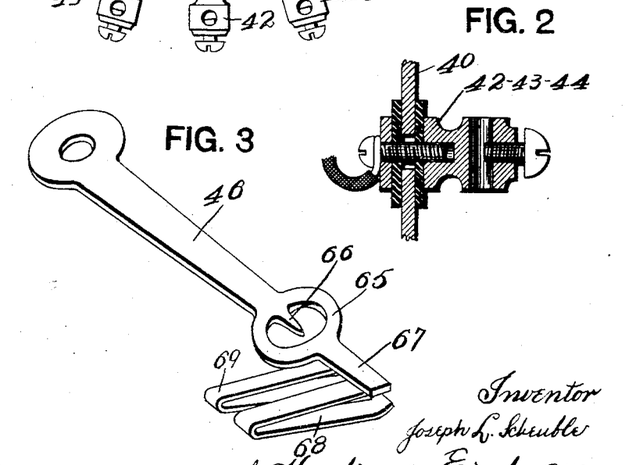
Fig. 2 is an enlarged longitudinal sectional view of one of the binding posts whereby the electric connection is effected from the exterior to the interior of the clock.
Fig. 3 is an enlarged perspective view of the contacting arm which is propelled by the clock mechanism.

The clock hand 46 is of the form illustrated in Figs. 1 and 3, having an open looped projection 65 within which the indicator 66 projects outwardly, and having an extended point 67 provided with two parallel U-shaped contact springs 68 and 69; the contact spring 68 contacts with the band 49, while the spring 69 contacts with the band 50.

The hand 46, being of conductive material, is constantly energized through the clock movement 41 which is in turn energized through the binding post 42 and the connecting wire 45. All of the adjustable contacting posts 60 and 61 are normally adjusted to a point beneath the bases 57 of the ratchets 56 and 56ª, so that upon the contact springs 68 and 69 dropping into the depressions 57, neither of said contacting springs 68 or 69 will contact with the contact posts 60 or 61.

Figure 15:
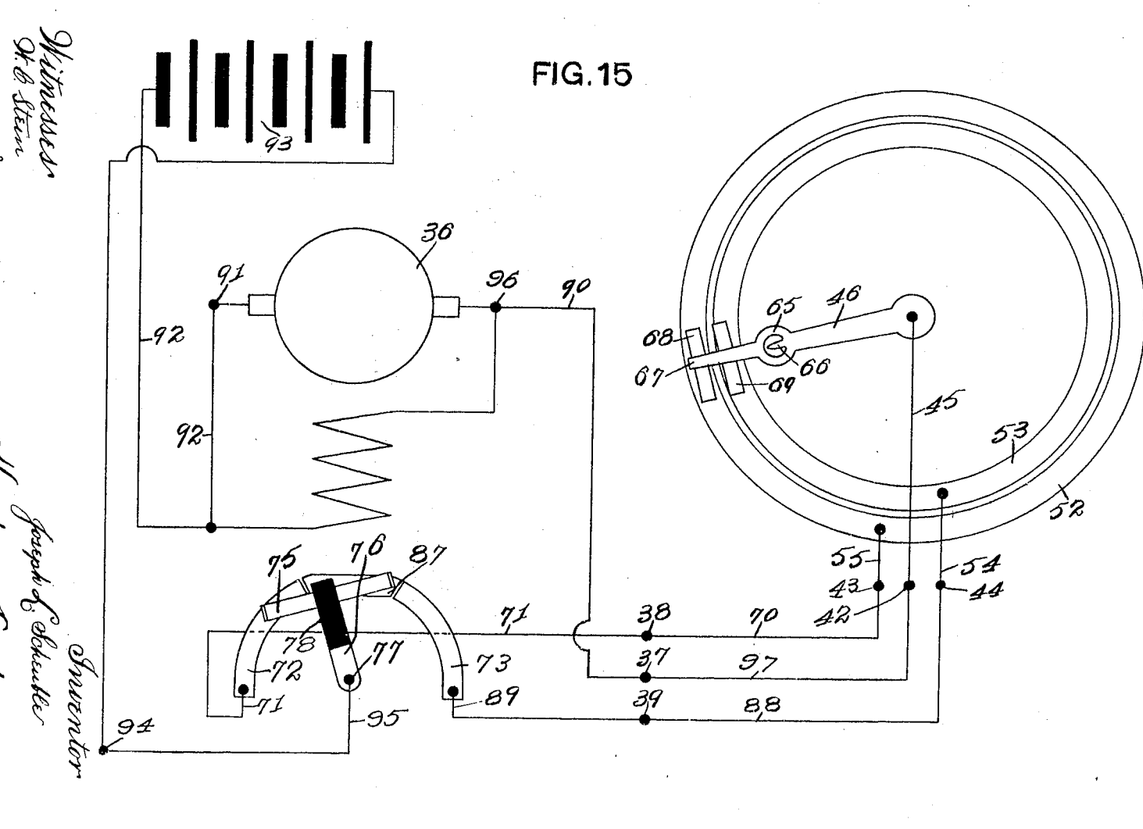
Fig. 15 is a diagrammatic view of the parts of the device embodying my invention, as illustrated in the other figures of the drawings, assembled in their proper relations.

To set the device to turn the snap-switch 20 "on" at 6 p. m., the adjustable contact post 60 in alinement with the point indicated upon the dial 47 as "6 p. m." is unscrewed to project from the base 57 of the ratchet teeth 56. Thereupon, when the hand 46 in its forward progress passes the tooth 56 registering with "6 p. m." upon the clock dial 47, the contact spring 68 will contact with the upper face of the contact post 60, closing the circuit to energize the motor 36, through the connecting wire 55 and binding post 43; thence through the connecting wire 70 (see Fig. 15) to the binding post 38; through the binding post 38 and conducting strip 71 to the contact plate 72, which is oppositely disposed to the contact plate 73 upon the insulated base-plate 74. A pivotally mounted contact spring 75 is fixed to the conductive arm 76 which is pivotally mounted upon the insulated base-plate 74 at the point indicated by the numeral 77, the arm 77 being energized through the conducting strip 95, leading from the binding post 94. Upon its outer face the arm 76 is provided with the insulated block 78 which is slidably held by the spring arms 79 and 80, which arms 79 and 80 are overlapped in the form of tongs and are provided at their upper extremities with the inwardly projecting prongs 81 and 82, respectively, having engagement with the ratcheted wheels 83 and 84, respectively; the ratcheted wheels 83 and 84 being rigidly mounted upon the shaft 24. The arms 79 and 80 at their point of overlapping are pivoted upon the pin 85 mounted in the plate 26; and the lower extremities of the arms 79 and 80 are held in contact with the insulated block 78 by means of the spring 86. The current being thus closed, the motor 36 is put in operation to rotate the shaft 24 and operate the key 21 through the fingers 22 carried by the support 23. When each of the fingers 22 has passed through the segment of 90°, the current is broken by the prong 82 engaging with one of the ratchets upon the wheel 84; the wheel 84 being provided with two oppositely disposed ratchets and the wheel 83 being provided with two similarly oppositely disposed ratchets, the diameters of the respective wheels 83 and 84, drawn through their ratcheted points, being at right-angles. The insulating block 78 is thus drawn away from the contact plate 72 and toward the contact plate 73, carrying the contact spring 75 out of contact with the plate 72 and into contact with the plate 73; the insulated base-plate 74 being provided with the neutral insulated plate 87 to serve as a bearing for the contact spring 75.

The utility of the circuit-breaking apparatus mounted on the insulated base-plate 74, next hereinbefore described, resides in the fact that but for this provision for breaking the circuit, the circuit would remain closed so long as the U-shaped contact spring 68 should remain in contact with the projecting contact post 60 registering with the hour of 6 p. m.

The switch 20 is so adjusted as to snap simultaneously with the engagement of the prong 82 with the ratchet on the wheel 84, thus permitting the circuit to remain closed just so long as is necessary to turn the switch "on".

Figure 9:
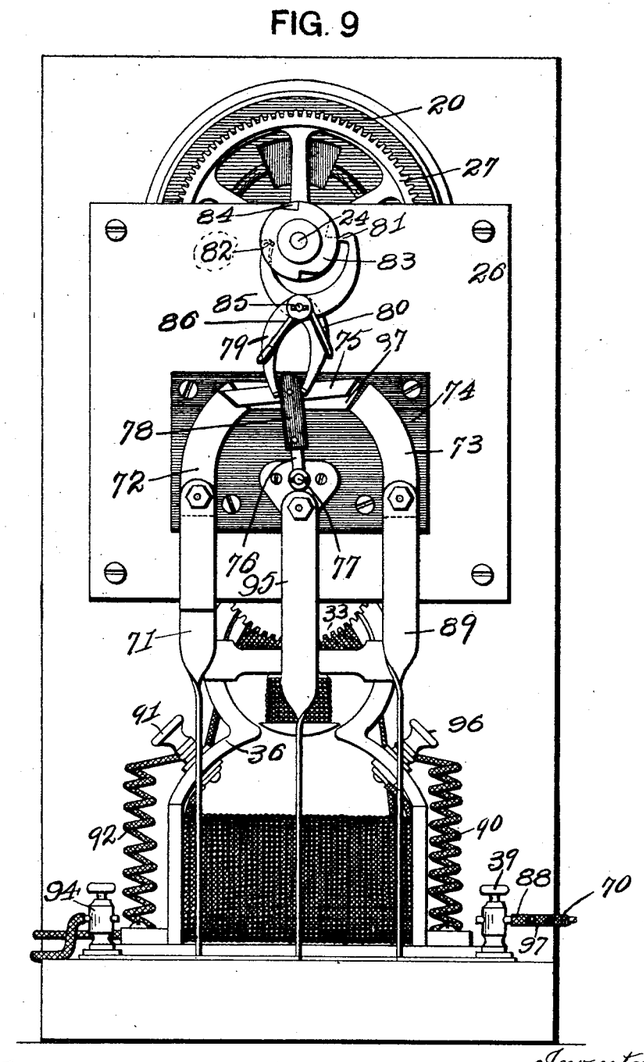
Fig. 9 is a front elevation of the motor whereby the snap-switch is opened and closed, showing its electrical connections.
Figure 10:
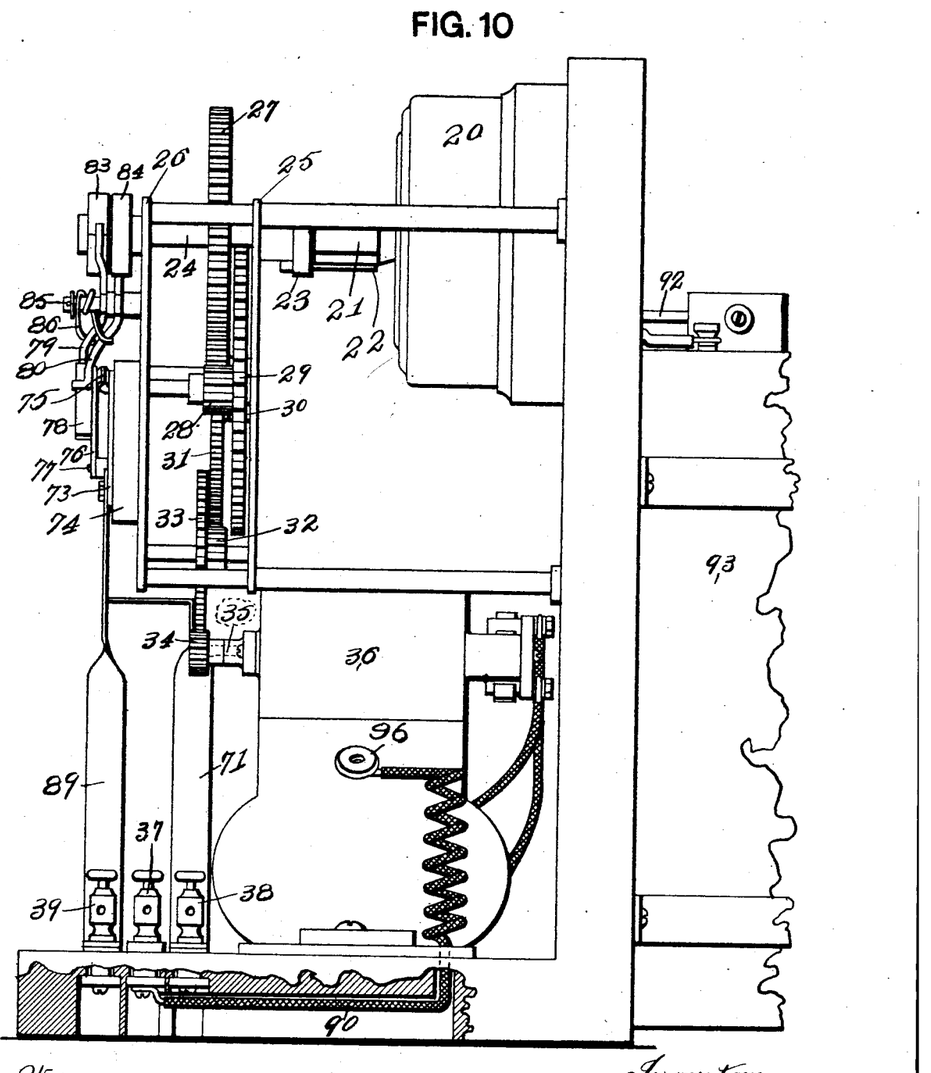
Fig. 10 is a side elevation of the same, showing a portion of the base broken away.
Figure 11:
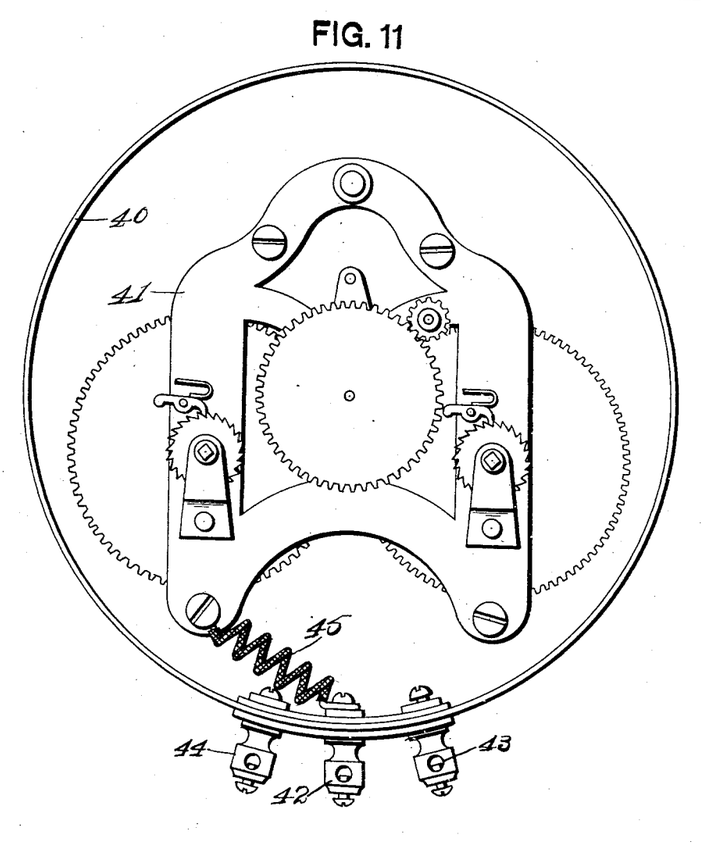
Fig. 11 is a front plan view of the internal mechanism of the clock, showing the electrical connections.
Figure 12:
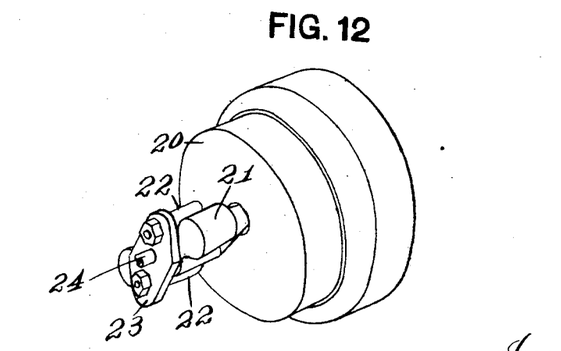
Fig. 12 is an enlarged perspective view of the snap-switch illustrated in Fig. 10, showing the means whereby its key is engaged with teeth rotated by the motor.
Figure 13:
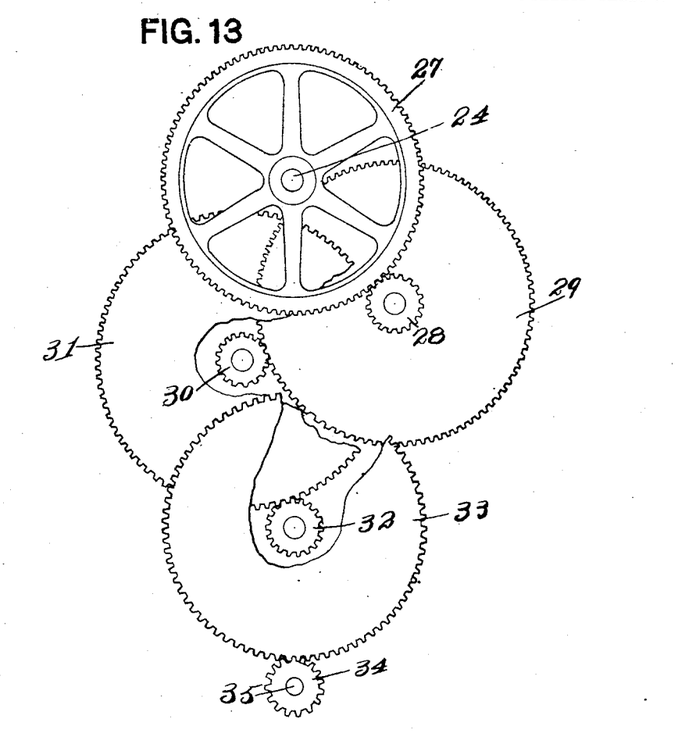
Fig. 13 is a front plan view of the train of gears whereby the switch-key is driven from the motor; being the train of gears illustrated in the side elevation of Fig. 10, shown with the front plate 26 removed.
Figure 14:
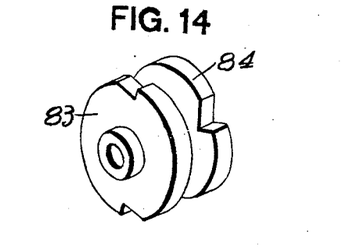
Fig. 14 is an enlarged perspective view of the ratcheted wheels 83 and 84.

Having thus provided for turning "on" the current for lighting or other purposes, my device is adapted to break said current by turning the switch 20 "off" at any desired predetermined hour by means and mode of operation which may be described as follows: Assuming that it is desired to break the current at the hour of 12 midnight, that one of the adjustable contact posts 61 seated in the band 50, which is at the base of the ratchet 56ª which registers with the hour of 12 on the "night" side of the dial 47, is unscrewed to project above the surface of the base of the next of the ratchet teeth 56ª, so that when the hand 46 reaches said hour of 12 o'clock midnight, the U-shaped contact springs 69 will contact with said projecting contact post 61; thus effecting the closing of the circuit through the plate 53, connecting wire 54 and binding post 44 (see Fig. 6); the connecting wire 88 (see Fig. 14), the binding post 39, vertical conducting strip 89, contact plate 73, and contact spring 75 (see Fig. 9). The current passing through the binding post 37 is conveyed to the binding post upon the motor 36 through the connecting wire 90; the binding post 37 being connected to the binding post 42 by the wire 97. The opposing current is admitted to the motor 36 through the binding post 91 and connecting wire 92 from the battery 93. The current thus closed is broken as before by the engagement of the prong 81 on the arm 80 with one of the ratcheted depressions on the wheel 83.

It is obvious that by loosely mounting the gear 27 upon the shaft 24, providing any well known form of clutch to impart motion from the gear 27 to the shaft 24, the upper end of the shaft 24 may be provided with an additional key whereby the key 21 may be turned by hand when desired, without invoking the instrumentality of the motor 36 and its connections.

While it is obvious that the device of my invention may be indifferently used for the closing and breaking of electric circuits for any purpose, by way of illustrating one of its applications, the form illustrated in the drawings may be said to efficiently serve for lighting and extinguishing lamps for display purposes between any desired hours of the day or night.

Figure 16:
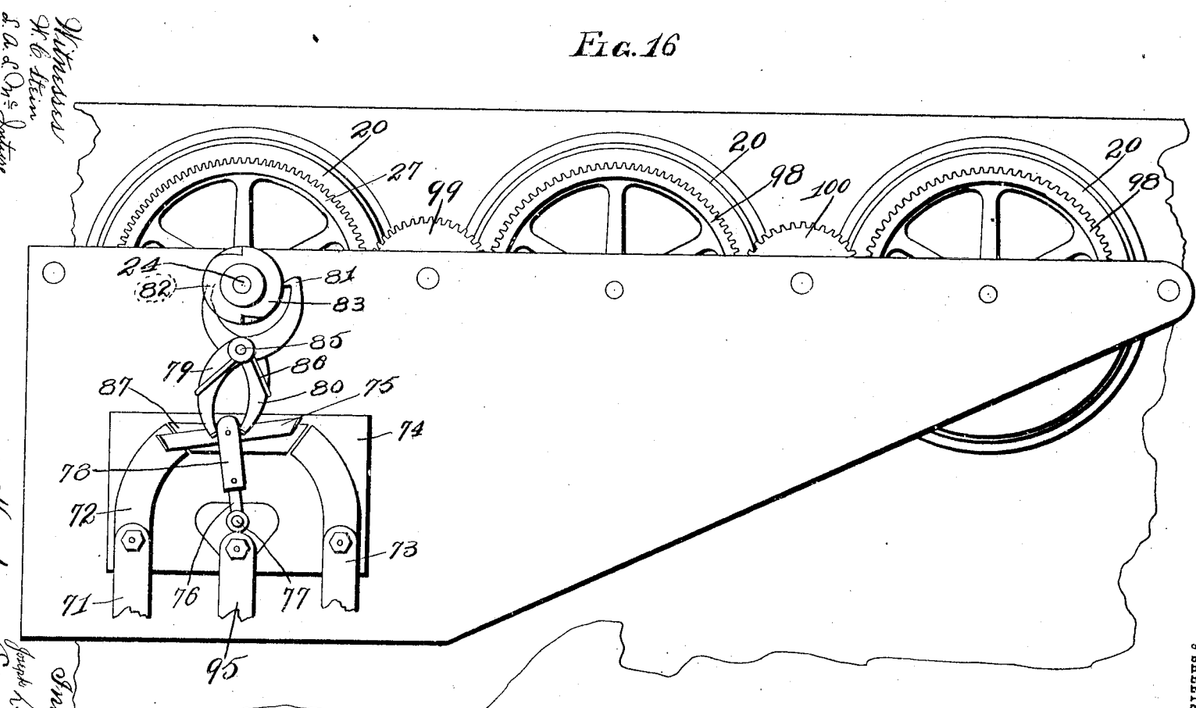
Fig. 16 is a front elevation of a device embodying my invention as applied to a series of snap-switches.

The application of the mechanism hereinabove described to an indefinite number of snap-switches may be accomplished in the manner illustrated in Fig. 16. As therein illustrated a series of snap-switches 20 is provided, each of which is controlled by means of the key and key-manipulated mechanism hereinbefore described. The key is actuated by the revolution of the sprocket-wheels 98—98, the first of which in the series is driven from the sprocket 27 by means of the small gear wheel 99, while power is imparted from the sprocket wheel 98 to the next of the sprocket-wheels 98 in the series through the small gear 100.

Having thus fully described my invention, what I claim as new and desire to have secured to me by the grant of Letters Patent, is:

1. In a chronometric electric switch, the combination of a rotary snap-switch; a rotatable clamp engaging the key of said switch; an electric motor whereby said clamp is rotated; a clock movement; a rotatable contact arm revolved by said clock movement, and provided at its outer extremity with a U-shaped contact spring; a ratcheted dial mounted upon said clock movement; an adjustable contact post seated at the base of one of the ratchets upon said dial and adapted to be adjusted to contact with said U-shaped contact spring to close the current whereby said motor is operated, substantially as described.

2. In a chronometric electric switch, the combination of a rotary snap-switch; a rotatable clamp engaging the key of said switch; an electric motor whereby said clamp is revolved; a rotatable conductive arm; a clock movement whereby said arm is rotated; a clock dial provided with two concentric ratcheted bands of insulating material; adjustable contacting posts seated at the bases of the ratchets upon said bands; two parallel U-shaped contact springs fixed at the outer end of said rotatable arm and adapted to contact alternately with said adjustable contact posts fixed in said dial to close and break the current supplied by said motor, substantially as described.

3. In a chronometric electric switch, the combination of a rotary snap-switch; a key whereby said switch is operated; a clamp engaging said key; a shaft whereby said clamp is rotated; an electric motor adapted to revolve said shaft; a train of gears whereby power is transmitted from said motor to said shaft; a pair of fixed contact plates adapted to be independently and successively energized; a spring contact plate adapted to contact successively with said plates; a ratchet wheel mounted on said shaft; and frictional engaging means actuated by said ratchet wheel to carry said spring contact plate out of contact with one of said fixed contact plates and into contact with the other of said fixed contact plates synchronously with the operation of the rotary snap-switch, substantially as described.

4. In a chronometric electric switch, the combination of a rotary snap-switch; a key whereby said switch is operated; a clamp engaging said key; a shaft whereby said clamp is rotated; an electric motor adapted to revolve said shaft; a train of gears whereby power is transmitted from said motor to said shaft; a pair of fixed contact plates adapted to be independently and successively energized; a spring contact plate adapted to contact successively with said plates; a ratchet wheel mounted on said shaft; frictional engaging means actuated by said ratchet wheel to carry said spring contact plate out of contact with one of said fixed contact plates and into contact with the other of said fixed contact plates synchronously with the operation of the rotary snap-switch; a clock-movement; a conductive arm rotated by said clock-movement; a dial fixedly mounted with relation to said clock-movement; adjustable contact posts mounted in said dial and adapted to contact with said arm at predetermined periods; and wire connections between said adjustable contact posts and said fixed contact plates, substantially as described.

5. In a chronometric electric switch, the combination of a rotary snap-switch; a key whereby said snap-switch is rotated; a revoluble plate provided with fingers adapted to engage with said key; a motor whereby said revoluble plate is rotated; a clock movement; a rotatable contact arm revolved by said clock movement; two parallel U-shaped contact springs fixed at outer end of said arm; two concentric ratcheted rings of insulating material mounted in the respective paths of travel of said contact springs; and adjustable contact posts mounted in the depressions of the ratchets upon said rings, substantially as described.

In testimony whereof, I have signed my name to this specification, in presence of two subscribing witnesses.

JOSEPH L. SCHEUBLE.

Witnesses:
JAMES L. HOPKINS,
L. A. L. McINTYRE.